United States Patent
O'Herron et al.

[19]

[11] Patent Number: 6,093,462
[45] Date of Patent: Jul. 25, 2000

[54] LOW ORIENTATION THERMOPLASTIC SHEET PRODUCTS AND PROCESSES

[75] Inventors: Michael R. O'Herron, Williamsburg; George R. Wright, Yorktown, both of Va.

[73] Assignee: Questech Packaging Inc., Newport News, Va.

[21] Appl. No.: 08/943,716

[22] Filed: Oct. 3, 1997

[51] Int. Cl.[7] .................................................. B29D 22/00
[52] U.S. Cl. ...................... 428/35.2; 428/35.4; 428/36.6; 428/36.7; 428/419; 428/474.7; 428/480; 428/500; 428/515; 428/520; 264/241; 264/314; 264/320; 264/322; 264/327; 220/640; 220/453
[58] Field of Search .................................. 478/36.6, 36.7, 478/474.7, 500, 515, 520, 430, 413, 35.2, 35.4; 264/241, 314, 320, 322, 327; 220/640, 453

[56] References Cited

U.S. PATENT DOCUMENTS

| | | | |
|---|---|---|---|
| 4,404,162 | 9/1983 | Miki et al. | 264/514 |
| 4,836,764 | 6/1989 | Parkinson | 425/384 |
| 4,997,691 | 3/1991 | Parkinson | 428/35.7 |
| 5,091,231 | 2/1992 | Parkinson | 428/36.6 |

OTHER PUBLICATIONS

ASTM Designation: D–1204, "Standard Test Method for Linear Dimensional Changes of Nonrigid Thermoplastic Sheeting or Film at Elevated Temperature", 1994.

*Primary Examiner*—Leszek Kiliman
*Attorney, Agent, or Firm*—Nixon & Vanderhye P.C.

[57] ABSTRACT

Inherently low orientation sheet is produced by extruding a thermoplastic material in its melt phase onto the surface of a chill roller and thereafter solidifying the sheet at a relatively slow chill rate. Importantly, the just extruded thermoplastic polymeric sheet (i.e., the melt) is urged into continuous surface-to-surface contact with the chill roll by a curtain of air impinging upon the sheet at a velocity sufficient to ensure such continuous surface-to-surface contact between the sheet and the chill roll, but insufficient to impart substantial stress to the sheet. In such a manner, therefore, the resulting sheet will exhibit a low inherent internal stress level as evidenced by an unusually low shrink rate (ASTM D-1204) of less than about 18%. The sheets of the present invention are thus especially characterized by such unusually low shrink rates, and hence unusually low inherent internal stress levels which find particular utility as containers for the packaging industry—especially containers produced by melt-phase deep-draw thermoforming techniques.

37 Claims, 2 Drawing Sheets

LOW ORIENTATION THERMOPLASTIC SHEET PRODUCTS AND PROCESSES

FIELD OF THE INVENTION

The present invention relates generally to the manufacture of low orientation sheets, and to the sheet products formed thereby. In preferred forms, the present invention is embodied in sheet products having at least one layer formed of a low orientation thermoplastic material. The sheet products of the invention may thus be in the form of monolayer or multilayer sheets. The low orientation sheet products of the present invention find particular utility as containers, for example, in the packaging industry.

BACKGROUND AND SUMMARY OF THE INVENTION

Monolayer and multilayer coextruded thermoplastic sheet products which provide both gas and moisture barriers and which are thereby useful as containers in the packaging industry are well known. Conventional processes for producing containers from such sheets generally include extruding sheets of plastic material, cutting blanks or billets from such sheets, heating the material to a desired temperature range, and pressure forming the material into containers.

Recently, processes have been developed which form deep drawn containers which are capable of withstanding the pressure and temperature conditions of a retort chamber. See in this regard, U.S. Pat. Nos. 4,836,764; 4,997,691 and 5,091,231 each issued to Keith Parkinson (the entire content of each being expressly incorporated hereinto by reference). In general, the processes disclosed in the Parkinson '764, '691 and '231 patents involves heating a central region of a disc or billet of thermoplastic sheet material to a temperature at or above its melt temperature while simultaneously keeping an annular region surrounding the central melt-phase region at a temperature to maintain the material in its solid phase. Raising the temperature of the central region of the billet so that it is in its melt-phase allows the central region to be deep drawn (i.e., drawn to a ratio of about 3:1 or greater of container lengthwise dimension to diameter (for circular cross-section containers) or average widthwise dimension (for rectangular cross-section containers).

Problems are encountered however if the billets from which such deep drawn containers are made are highly oriented (i.e. having an ASTM D-1204 shrink rate of greater than 20%). For example, if billets formed of highly oriented thermoplastic sheet are employed in the processes disclosed in the Parkinson '764, '691 and '231 patents cited above, there exists the possibility that the billets will shrink during the heating process prior to thermoforming to an extent that the billets can no longer be carried by their respective support structures. As a result, such highly oriented billets can, and do, fall from their respective support structures while being heated in the oven thereby causing problems during production.

It would therefore be desirable if sheets products could be made that had an inherently low orientation (i.e., an ASTM D-1204 shrink rate of less than about 18%) which could then be employed as the source from which billets could be formed for use in the above-cited Parkinson -764, '691 and '231 processes. It is toward fulfilling such a need that the present invention is directed.

Broadly, the present invention is embodied in processes whereby thermoplastic sheets may be made having minimal internal stresses (orientation), and to the resulting relatively low orientation sheets made therefrom. In preferred forms, the present invention is embodied in sheet products having at least one layer formed of a low orientation thermoplastic material. The sheet products of the invention may thus be in the form of monolayer or multilayer sheets. If multilayer sheets are produced, one of the layers may be formed of a thermoplastic material which forms an inherent barrier to oxygen transport therethrough. Such multilayer sheets are therefore particularly useful in the packaging industry—i.e., since containers can be made therefrom which are both retortable and which provide excellent oxygen barrier properties.

In general essence, inherently low orientation sheet is produced by extruding a thermoplastic material in its melt phase onto the surface of a chill roller and thereafter solidifying the sheet at a relatively slow chill rate (e.g., less than about 60° F./min, typically between about 40 to about 60° F./min, most preferably between about 50 to about 55° F./min). Importantly, the just extruded thermoplastic polymeric sheet is urged into continuous surface-to-surface contact with the chill roll by a curtain of air impinging upon the sheet at a velocity sufficient to ensure such continuous surface-to-surface contact between the sheet and the chill roll, but insufficient to impart substantial stress to the sheet. The term "continuous surface-to-surface" contact and like terms, are meant to convey that the sheet-like melt extruded from the die has an entirety of one surface between opposed widthwise points of the melt in contact with a chill roll such that no gaps or spaces exist between the melt and the chill roll along a line joining such widthwise points. "Discontinuous contact" therefore is meant to refer to gaps or spaces that exist between the surfaces of the melt and the chill roll that are present along a line joining opposed widthwise points of the melt.

In such a manner, therefore, the resulting sheet will exhibit a low inherent internal stress level as evidenced by an unusually low shrink rate (ASTM D-1204) of less than about 18%, preferably between about 5% to about 16%, and more preferably between about 5% to about 10%. By way of example, low density polyethylene sheets having shrink rates of between about 15% to about 16% have been successfully produced and employed to form deep drawn containers. The sheets of the present invention are thus especially characterized by such unusually low shrink rates, and hence unusually low inherent internal stress levels, which find particular utility as containers for the packaging industry—especially containers produced by melt-phase deep-draw thermoforming techniques.

These and other aspects and advantages of the present invention will become more clear after careful consideration is given to the detailed description of the preferred exemplary embodiments of this invention which follow.

BRIEF DESCRIPTION OF THE ACCOMPANYING DRAWINGS

FIG. 1 is a schematic view of an exemplary process in accordance with the present invention; and FIG. 2 is a schematic cross-sectional elevation view of an exemplary multilayer sheet in accordance with the present invention.

DETAILED DESCRIPTION OF THE INVENTION

Figure 1:
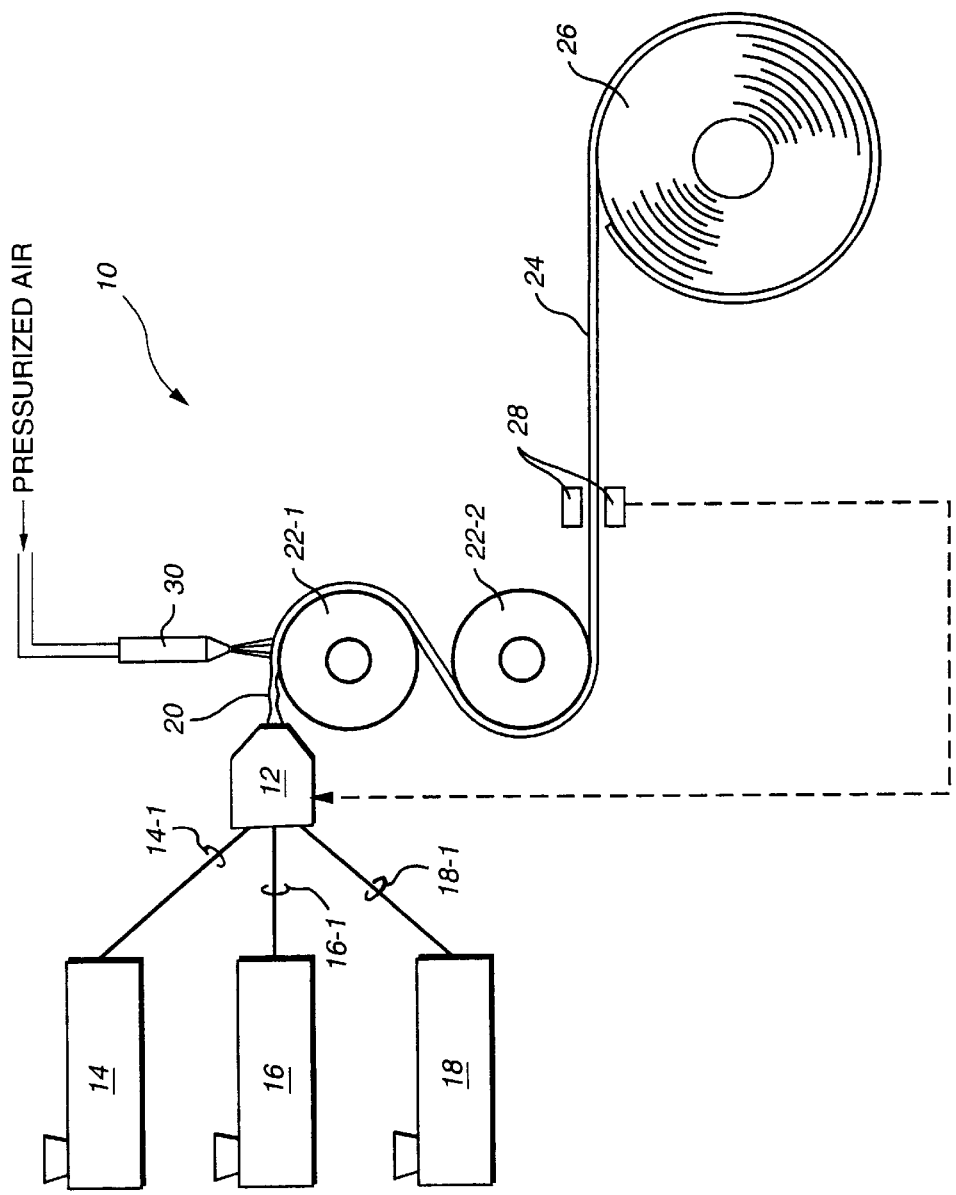

Accompanying FIG. 1 depicts in schematic fashion an exemplary sheet processing system 10 that may be employed in the practice of the present invention. Specifically, a conventional autoflex die 12 (e.g., Extrusion Die Inc.) having a die slit of controllable thickness receives the melt flows via input lines 14-1, 16-1 and 18-1 from conventional screw extruders 14, 16 and 18, respectively. The multiple extruders 14, 16 and 18 most preferably supply the die 12 with respectively different thermoplastic melt flows so as to form a multilayer composite sheet structure. However, the present invention is equally applicable to monolayer sheet structures in which case only one of the extruders 14, 16 or 18 needs to be used.

The output of the die 12 is a coextruded, sheet-like melt 20 which is solidified by passage in contact with chill rolls 22-1, 22-2 to form sheet product 24. The sheet product 24 may then be wound into a suitable package 26. The widthwise dimensions of the melt 20, and hence the resulting sheet product 24, is not critical and may be selected depending upon the end use of the sheet 24 (e.g., the equipment which may be employed to process the sheet downstream). Thus, for example, standard sheet widths of 18 inches, 24 inches and 30 inches or greater may be employed in the practice of this invention.

The thickness dimension of the final sheet product 24 is substantially the same as the thickness dimension of the melt 20. In other words, substantially no draw-down of the melt 20 occurs between the chill rolls 22-1 and 22-2 (i.e., the chill rolls 22-1 and 22-2 are operated at substantially the same speed).

For a given extrusion rate of die 12, the chill rolls 22-1 and 22-2 will be rotated at the proper speed so that minimal stress is induced to the melt 20. The thickness dimension of the final sheet product 24 is controlled by a feed-back control loop to the die 12 from thickness sensors 28. In this regard, the thickness sensors 28 will monitor the thickness dimension of the final sheet product and, in response to sensing a thickness that deviates from a predetermined set point, will command the die 12 to make relatively minor (but meaningful) thickness corrections of the die slit.

Important to the present invention, the system 10 includes an air knife 30 positioned downstream of the die 12 and oriented parallel to the roll axis of the chill roll 22-1. The air knife 30 extends the entire widthwise dimension of the melt 20. The air knife 30 thus directs a curtain of air perpendicularly against the melt 20 immediately downstream of the die 12. As noted previously, the air curtain created by the air knife 30 causes the melt 20 to be brought into continuous surface-to-surface contact with the chill roll 22-1. That is to say, the air knife 30 urges the entire widthwise extent of the melt 20 into contact with the surface of the chill roll 22-1 so that no air pockets or like areas of non-contact between the chill roll 22-1 and the melt 20 are present. As a result, substantially even cooling, and hence solidification, of the thermoplastic material ensues so as to achieve the final sheet product 24.

Virtually any sheet-formable thermoplastics material may be employed in the practice of this invention, including (but not limited to) polymers and copolymers of polyolefins (such as polypropylenes, polyethylenes and the like), polyesters, polyamides (e.g., nylons), polyphenylene oxides, polyphenylene sulfides, polyvinyl chlorides, acrylonitriles and the like. Blends of such thermoplastics materials may also be employed in any desired blend ratio to suit desired end use applications. Particularly preferred for the ultimate fabrication of containers for use in the packaging industry are food grade polyolefins, with polyethylenes being particularly preferred. One particularly preferred thermoplastics material due to its compatibility with packaging products is low density polyethylene (LDPE). The preferred LDPE will have a melt index of less than about 2.5 g/10 min (typically about 1.9 g/10 min.), a density of less than about 0.950 g/cm$^3$ (typically about 0.922 g/cm$^3$) and a melting point of less than about 250° F. (typically about 230° F.). One preferred LDPE is ESCORENE® low density polyethylene commercially available from Exxon Chemical Company.

Figure 2:
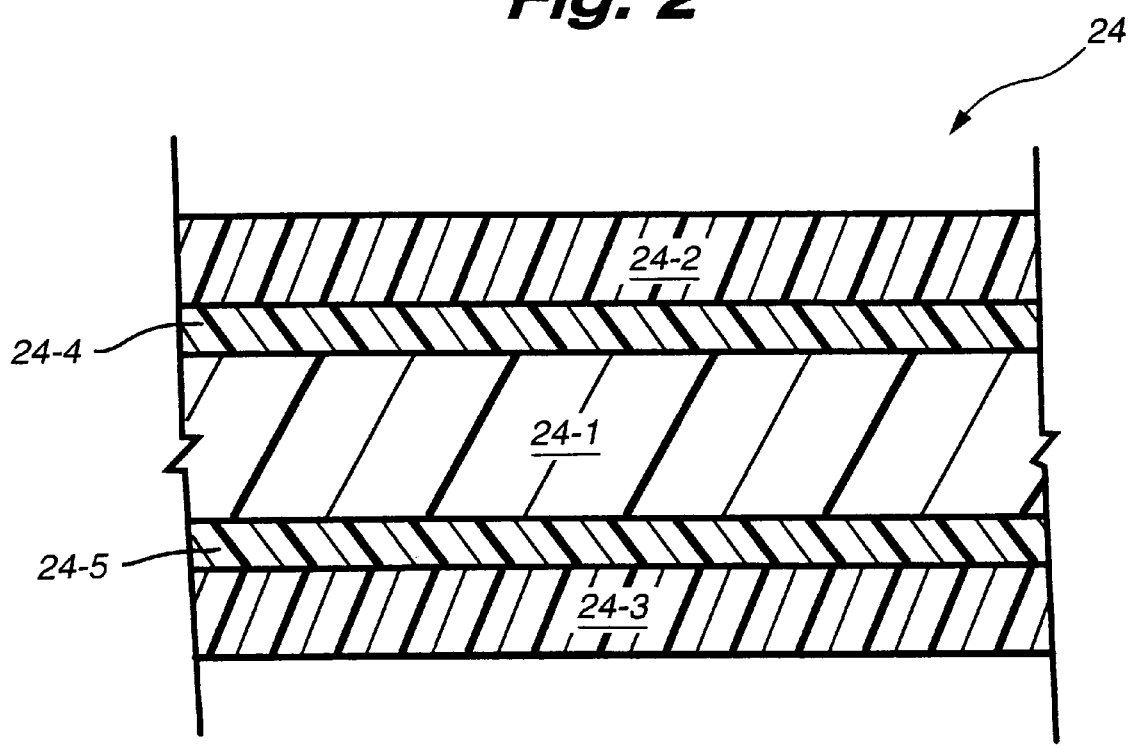

Accompanying FIG. 2 shows one embodiment of an exemplary multilayer final sheet product 24 that may be produced in accordance with the present invention. In this regard, the sheet product 24 includes a core layer 24-1 of a thermoplastics material sandwiched between outer layers 24-2 and 24-3. Optionally, intermediate layers 24-4, 24-5 may be interposed between the outer layers 24-2 and 24-3 and the core layer 24-1, respectively, so as to impart desired physical properties to the resulting sheet product 24.

When the sheet product 24 is employed to later form containers, the outer layers 24-2 and 24-3 may be a food grade polyolefin, for example, a low density polyethylene. The core layer 24-1 may be formed of a thermoplastics material having oxygen barrier properties. By sandwiching an oxygen barrier layer 24-1 between outer layers 24-2, 24-3 formed of food grade LDPE, a sheet product 24 may be made which exhibits excellent strength properties while also providing enhanced oxygen barrier properties that are desirable of containers. By the term "oxygen barrier" is meant a thermoplastics material that exhibits an oxygen permeability according to ASTM D-1434 of less than about 0.010, preferably less than about 0.005, and most preferably less than 0.003 cc.mil/100 in$^2$/24 hrs./atm. at 65% relative humidity (RH) and 68° F. Exemplary classes of oxygen barrier thermoplastics materials include ethylene vinyl alcohol (EVOH) copolymers (e.g., commercially available from Eval Company of America under the registered trademark EVAL®), polyvinylidene chlorides (e.g., commercially available from Dow Chemical under the registered trademark SARAN®), oriented and non-oriented polyamides (e.g., nylon 6), and oriented polyesters. The selection of any particular oxygen barrier material is dependent upon a number of factors, including the desired container properties and its end use application.

The core layer 24-1 may include blends of thermoplastic materials such as those described previously. In addition, the core layer 24-1 may be composed partly or entirely of recycled thermoplastics material. One particularly convenient source of recycled thermoplastics material is the sheet web that remains as scrap after billets have been cut therefrom according to the processing techniques described in the above-cited Parkinson '764, '691 and '231 patents. Such scrap sheet web may be ground into suitable nominal particle sizes as feed to that one of the extruders 14, 16 or 18 which coextrudes the core layer 24-1 with the outer layers 24-2, 24-3. If present, the recycled thermoplastics material should be blended with a compatible virgin thermoplastics material in an amount of less than about 25 vol. %, typically less than about 20 vol. %, based on the total weight of the blend of virgin and recycled thermoplastics materials.

The intermediate layers 24-4 and 24-5 may be formed of virtually any thermoplastics material chosen to enhance particular physical properties of the resulting sheet product 24. In the context of preparing continuously cast sheet as described above, the intermediate layers 24-4 and 24-5 are most preferably a thermoplastics material which contributes to the melt strength of the resulting multilayer sheet product 24. One particularly preferred thermoplastics material for such purpose is metallocene linear low density polyethylene (MLLDPE) having a melt index of less than about 4.0 g/10 min. (typically about 3.4 g/10 min.), a density of less than about 0.925 g/cm³ (typically about 0.917 g/cm³) and a melting point of less than about 245° F. (typically about 239° F.). One particularly preferred MLLDPE material is commercially available from Exxon Chemical Company as EXCEED™ 357C32 polyethylene.

The core layer 24-1 will most preferably comprise between about 2 vol. % to about 90 vol. % of the sheet product 24, more preferably between about 5 vol. % to about 80 vol. %, based on the total volume of the sheet product 24. The outer layers 24-2 and 24-3 will most preferably collectively comprise between about 10 vol. % to about 98 vol. %, more preferably between about 20 vol. % to about 90 vol. %, of the sheet product 24, based on the total weight of the sheet product 24. The outer layers 24-2, 24-3 will most preferably be present in the sheet product 24 in symmetrical amounts (and thicknesses), but asymmetrical amounts (and thicknesses) could also be employed, if desired. The intermediate layers 24-4 and 24-5, if present, will most preferably collectively comprise between about 10 to about 50 vol. %., typically between about 30 to about 40 vol. % of the sheet product 24, based on the total volume of the sheet product 24.

Although not depicted in FIG. 2, the multilayer sheet product 24 may be provided, if needed, with tie layers interposed between adjacent ones of the other layers described previously. The tie layers are most preferably a thermoplastics material which adhesively bonds one thermoplastic material to another and is chosen based on its compatibility and adhesive qualities depending on the nature of the thermoplastics materials forming the layers between which it is interposed. If used, the tie layers may be coextruded with the core, outer and, if present intermediate layers using a separate dedicated extruder. One particularly preferred thermoplastic material that may be employed as a tie layer is PLEXAR® PX 380 modified linear low density polyethylene commercially available from Quantum Chemical Company.

A further understanding of the present invention will be obtained from the following non-limiting examples thereof.

EXAMPLE 1

The system 10 described above was used to produce a multilayer sheet product 24 having a core layer 24-1 formed of EVOH and outer layers 24-2 and 24-3 comprised of LDPE. The core layer constituted about 5% by volume of the sheet product and was about 2 mils thick, while the outer layers collectively constituted about 95% by volume of the sheet product with each outer layer having a thickness of about 19 mils.

Extruders 14 and 16 were employed so as to extrude the EVOH and LDPE components, respectively, while extruder 18 was employed so as to extrude a modified LLDPE thermoplastic material forming the tie layers. The melt flows of thermoplastic materials were directed to the die 12 so as to coextrude the core layer sandwiched between the outer layers with the tie layers interposed between each adjacent layer.

The melt was extruded from the die 20 at a rate of 14 ft/min and a thickness of about 40 mils. The chill rolls 22-1 and 2202 were each 24 inches in diameter and were rotated at a rate to achieve a chill rate of about 53° F./min. A conventional air knife (Welex Corporation, Blue Bell, Pa.) was positioned perpendicular to the melt 20 and oriented parallel to the central axis of roll 22-1. The air knife had a slit opening of about 0.007 inch extending the entire widthwise dimension of the melt. The air knife was supplied with 2–3 psi pressurized air which exited the air knife slit and impinged directly on the upper surface of the melt so as to encourage the melt to come into continuous contact with the surface of the chill roll 22-1.

The sheet produced by this Example 1 was tested for shrink rate according to ASTM D-1204 and was found to have a shrink rate of about 16%. Baby bottle liners of good quality were thereafter produced from billets cut from the sheet using the techniques described in the above-referenced '764, '691 and '231 patents.

EXAMPLE 2

Example 1 above was repeated except that a monolayer sheet product having a sheet thickness of about 40 mils and formed of LDPE was produced. The sheet produced by this Example 2 had a shrink rate (ASTM D-1204) of about 16%. Baby bottle liners of good quality were thereafter produced form billets cut from the sheet using the techniques described in the above-referenced '764, '691 and '231 patents.

EXAMPLE 3 (Comparative)

Example 2 was repeated except that no air knife 30 was employed. The resulting sheet product had a low shrink rate of about 13%, but was commercially unusable as feedstock to produce deep drawn containers due to the severe surface and thickness irregularities that were present by virtue of the discontinuous contact between the sheet-like melt and the chill roll surface.

EXAMPLE 4 (Comparative)

LDPE sheet produced by extruding a sheet-like melt into the nip of an opposed pair of chill rolls was obtained and tested for shrink orientation according to ASTM D-1204. The sheet was determined to have an unacceptably high shrink rate of between about 60–70%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for making thermoplastic sheet comprising the steps of:
    (a) forming a sheet by extruding a melt of a thermoplastic material onto a surface of a chill roll;
    (b) directing a curtain of pressurized air against a widthwise extent of the melt sufficient to cause the melt to establish continuous surface-to-surface contact with the chill roll along the widthwise direction thereof; and
    (c) solidifying the melt while in surface-to-surface contact with the chill roll to form a low orientation thermoplastic sheet having an orientation of less than about 18% according to ASTM D-1204.

2. The process of claim 1, wherein step (b) is practiced by directing a curtain of air from an air knife oriented such that the air curtain is substantially perpendicular to the melt and aligned with the chill roll axis.

3. The process of claim 1, wherein said air curtain is insufficient to impart substantial stress to the sheet.

4. The process of claim 1, comprising passing the melt along a cooling path comprised of a pair of chill rolls.

5. The process of claim 1, wherein the sheet orientation is between about 5% to about 16%.

6. The process of claim 1, wherein the sheet orientation is between about 5% to about 10%.

7. The process of claim 1, wherein the sheet orientation is between about 15% to about 16%.

8. The process of claim 1, wherein step (c) is practiced at a cooling rate of less than about 60° F./min.

9. The process of claim 8, wherein the cooling rate is between about 40 to about 60° F./min.

10. The process of claim 8, wherein the cooling rate is between about 50 to about 55° F./min.

11. The process of claim 1, wherein the sheet includes at least one layer of a thermoplastics material selected from the group consisting of polymers and copolymers of polyolefins, polyesters, polyamides, polyphenylene oxides and sulfides, polyvinyl chlorides, and acrylonitriles.

12. The process of claim 1, wherein the sheet is a multilayer sheet comprised of a core layer sandwiched between a pair of outer layers.

13. The process of claim 12, wherein the core layer includes at least a portion of recycled thermoplastics material.

14. The process of claim 13, wherein the recycled thermoplastics material is present in an amount of less than 25 vol. %.

15. The process of claim 12, wherein the core layer is formed entirely of recycled thermoplastics material.

16. The process of claim 12, wherein the core layer is formed of a thermoplastics material having oxygen barrier properties.

17. The process of claim 16, wherein the core layer is formed of at least one oxygen barrier material selected from the group consisting of ethylene vinyl alcohol copolymers, polyvinylidene chlorides, oriented and non-oriented polyamides, and oriented polyesters.

18. The process of claim 12, 13 or 16 wherein each of the outer layers is formed of a low density polyethylene.

19. The process of claim 18, wherein the sheet includes intermediate layers interposed between each of the outer layers and said core layer.

20. The process of claim 19, wherein each of the intermediate layers is formed of a metallocene linear low density polyethylene.

21. The process as in claim 1, wherein step (a) is practiced so that the melt has a thickness of between about 10 mils to about 250 mils.

22. The process as in claim 21, wherein the melt has a thickness of about 40 mils.

23. A thermoplastic sheet having a low shrink rate of less than about 18% as determined according to ASTM D-1204.

24. The sheet of claim 23, which includes at least one layer of a thermoplastics material selected from the group consisting of polymers and copolymers of polyolefins, polyesters, polyamides, polyphenylene oxides and sulfides, polyvinyl chlorides, and acrylonitriles.

25. The sheet of claim 23, wherein the sheet is a multilayer sheet comprised of a core layer sandwiched between a pair of outer layers.

26. The sheet of claim 25, wherein the core layer includes at least a portion of recycled thermoplastics material.

27. The sheet of claim 26, wherein the recycled thermoplastics material is present in an amount of less than 25 vol. %.

28. The sheet of claim 25, wherein the core layer is formed entirely of recycled thermoplastics material.

29. The sheet of claim 25, wherein the core layer is formed of a thermoplastics material having oxygen barrier properties.

30. The sheet of claim 29, wherein the core layer is formed of ethylene vinyl alcohol copolymers, polyvinylidene chlorides, oriented and non-oriented polyamides, and oriented polyesters.

31. The sheet of claim 25, 26 or 29, wherein each of the outer layers is formed of a low density polyethylene.

32. The sheet of claim 31, wherein the sheet includes intermediate layers interposed between each of the outer layers and said core layer.

33. The sheet of claim 32, wherein each of the intermediate layers is formed of a metallocene linear low density polyethylene.

34. The sheet as in claim 25, having a thickness of between about 10 to about 250 mils.

35. A product which includes the sheet of claim 25.

36. The product of claim 35, in the form of a container.

37. The product of claim 35, the form of a packaging container.

* * * * *